No. 706,986. Patented Aug. 12, 1902.
P. MODERSON.
LAWN SPRINKLER.
(Application filed Nov. 7, 1901.)
(No Model.)
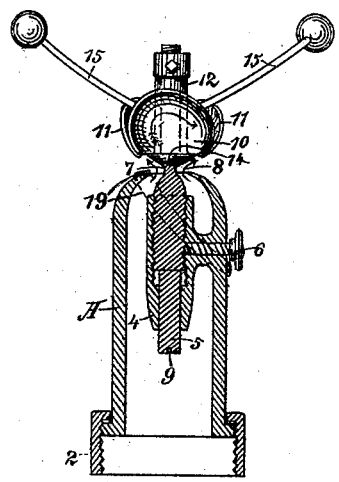
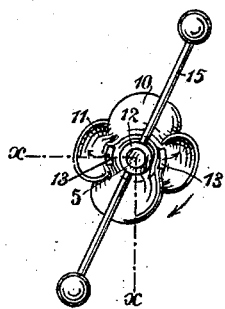
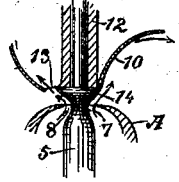
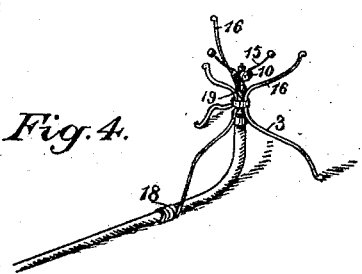
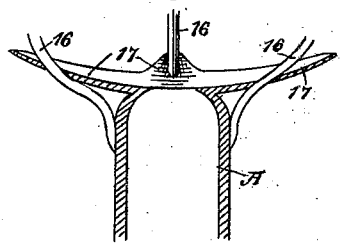
Witnesses,
Inventor,
Paul Moderson
By Dewey Strong & Co.
Attys.

UNITED STATES PATENT OFFICE.

PAUL MODERSON, OF FRUITVALE, CALIFORNIA.

LAWN-SPRINKLER.

SPECIFICATION forming part of Letters Patent No. 706,986, dated August 12, 1902.

Application filed November 7, 1901. Serial No. 81,416. (No model.)

*To all whom it may concern:*

Be it known that I, PAUL MODERSON, a citizen of the United States, residing at Fruitvale, county of Alameda, State of California, have invented an Improvement in Lawn-Sprinklers; and I hereby declare the following to be a full, clear, and exact description of the same.

My invention relates to a device for the distribution of water for sprinkling lawns and for like purposes.

It consists of the parts and the constructions, arrangements, and combinations of parts which I will hereinafter describe and claim.

The details of my invention will be more fully set forth hereinafter, having reference to the accompanying drawings, in which—

Figure 1 is a vertical section through the nozzle and connections. Fig. 2 is a top view of the same. Fig. 3 is a vertical section on the line $x\ x$ of Fig. 2. Fig. 4 shows the nozzle attached to a tripod. Fig. 5 shows the guard-rods passing through conductors.

A represents a nozzle adapted to be attached by a suitable coupling, as 2, to a hose. This nozzle may be supported, if desired, upon a portable tripod or stand 3. Within the nozzle is formed a projection or bracket 4, which is provided with a threaded bore standing axially in line with the discharge-orifice of the nozzle. A spindle 5, threaded in its upper portion, is adjustable in this bore, and a set-screw 6 serves to lock the spindle in place. The bracket is made of thin metal standing edgewise and in the line of discharge, so as not to impede the passage of the water. The walls of the nozzle around the opening through which the spindle passes are made converging, as shown, while the spindle is provided with an annular groove 7, coincident with this opening. The annular space 8 between the spindle and the walls forms the discharge-outlet of the nozzle. By screwing the spindle up or down in the threaded projection one or the other of the oppositely-inclined and cone-shaped sides of the groove 7 is brought nearer to the nozzle-walls and the discharge-opening varied in size, at the same time altering the deflection of the water. The lower end of the spindle is provided with a groove 9, in which a screw-driver fits, so that the turning of the spindle is easily effected. Upon the spindle are mounted the spreading and distributing wings 10 and 11. These wings may be made of light metal and are carried upon a sleeve 12, which is turnable upon the spindle. The wings are so curved that water discharging from the nozzle A striking the curved and angular sides of the wings will cause a reactionary movement, by which they are rapidly revolved, and the water will be thrown upwardly and outwardly, falling upon a circular space of considerable area. The form of these wings is an important feature of my invention. Instead of making them uniform, like ordinary propeller-blades, certain of them, as 10, are concaved and adapted to receive the impingement of the water upon their lower or outer face, while alternate blades 11 are convexed and are supported only at their sides, so as to leave a space 13 between their lower edge and the sleeve 12. The water passing up through the openings 13 impinges upon the inner and upper side of the blades, and is consequently thrown upwardly and falls within a lesser radius than the water which is cast off from the blades 10. The result is that the water is distributed more evenly over the area within the radius of the sprinkler than is possible by sprinklers of the ordinary type. The sleeve is given a certain amount of play lengthwise of the spindle. The disposition of the wings 10 and 11 in relation to each other and to their respective water-currents is such that these currents so act upon each as to counteract any tendency one current may have to lift the wings. In order, however, to insure the proper seating always of the wings and sleeve upon the cone 14 immediately above the groove 7, I provide the radial weighted extensions 15. These weights serve also to give steadiness and smoothness to the wings when they are revolving rapidly. In order to protect the wings and prevent their being damaged by accidental overturning of the sprinkler, I have shown a sort of inclosing cage, which is supported from the nozzle. It consists in this case of arms 16, radiating outwardly and upwardly from the nozzle. These arms are preferably made of thin material or with knife-edges presented toward the wings, so as to offer little or no resistance to the distribution and spreading of the water. In order to prevent the water from dripping down along these arms, I have shown concaved conductors 17, extending outwardly around the nozzle and through which conductors the arms 16 pass, so that any drip passing down these arms will be received by the conductors 17, and will thus be returned into the top of the nozzle A, where it mingles with the water being discharged from the nozzle and is given the impulse which again carries it outwardly, or the nozzle may be supported in a tripod 3 of the following construction: The inner or upper ends of the legs of the tripod are secured to a collar or hub, which is adapted to receive and retain the nozzle in an upright position. The legs curve outwardly and upwardly to a height above the wings. In case the tripod should upset no damage would occur to the sprinkler.

In order that the apparatus may be moved from place to place upon a lawn without the necessity of shutting off the water each time a change is to be made, I provide one of the legs of the stand with a clamp 18, through which the hose may be passed and, if desired, secured therein. Accordingly the operator has but to take hold of the hose outside the watered area and the tripod may be drawn along the ground without being overturned.

At times it is desired to water only a limited portion of a circle, as in a corner of the grounds. This is done by closing a part of the orifice 8, so that water only issues from one side. This is done by means of a flexible band 19, of rubber or like material, which normally incloses tightly the body of the nozzle. By simply passing one end of the band over the orifice and having the other end of the band supported by a suitable stop, as the screw 6, a portion of the orifice 8 is closed and water only issues at one side of the spindle and is thrown by the wings over only a segment of the area usually watered. The action of the wings is in no way interfered with by the band.

Having thus described my invention, what I claim, and desire to secure by Letters Patent, is—

1. The combination in a sprinkler of a nozzle, means for conducting water thereto, a stem or spindle supported in the line of the axis of said nozzle, and wings turnable with relation thereto and adapted to divert and spread the water discharged from the nozzle, said wings having two sets of members with the members of one set adapted to receive water on their outermost sides, and the members of the other set adapted to receive water on their innermost sides.

2. The combination of a discharge-nozzle, means for conducting water thereto, a spindle fixed axially in line with said nozzle, distributing-wings turnable upon the spindle exterior to the nozzle, and certain of said wings adapted to receive water on their outermost sides and certain other of the wings adapted to receive water on their innermost sides, and a diverging cone upon the spindle and located in the discharge-orifice.

3. A nozzle, means for conducting water thereto, a spindle supported axially in line with said nozzle, distributing-wings freely turnable upon the spindle exterior to the nozzle, and certain of said wings adapted to receive water on their outermost sides and certain other of the wings adapted to receive water on their innermost sides, a diverging cone located between the nozzle and the wings and means for adjusting said cone and regulating the discharge through the nozzle.

4. The combination with a nozzle and a support, of alternate concaved and convexed distributing-wings carried by the support in such manner that water is received upon the lower outer face of one set of vanes, and upon the upper and inner side of the other set of vanes, whereby the water discharged by one set of vanes falls within a lesser radius than the water that is discharged by the other vanes.

5. The combination in a sprinkler of a nozzle, a spindle fixed axially in line with the discharge-orifice thereof, distributing-wings upon said spindle, said wings having certain members adapted to receive the water on their outermost sides, and other of said members adapted to receive the water on their innermost sides.

6. The combination in a sprinkler of a nozzle, a spindle fixed axially in line with the discharge-orifice thereof distributing-wings turnable upon said spindle, said wings having certain of their members adapted to receive the impingement of the water on their outermost faces, other of said members having their surfaces oppositely curved and alternating with the first-mentioned members, said second members having their lower edges disposed at a distance from the hub of the wings so that a passage is formed whereby the impingement of the water is upon the innermost of said wing-surfaces.

7. The combination in a sprinkler of a nozzle, distributing-wings supported and revoluble axially in line with said nozzle, said wings having two sets of members with the members of one set adapted to receive water on their outermost sides and the members of the other set adapted to receive water on their innermost sides, radial weighted arms revoluble with and carried by said wings, and means whereby a portion of the discharge-orifice of the nozzle is closed.

8. In a lawn-sprinkler, the combination of a nozzle having its walls at its discharge end converging sharply, a spindle supported within and in axial alinement with said discharge-orifice, said spindle having an annular groove coincident with the edges of the converging walls of said nozzle and distributing-wings revoluble upon said spindle, said wings arranged in two sets, one concaved and the other convexed, and one of said sets receiving water upon the outermost sides and the other set receiving water upon the innermost sides.

9. In a lawn-sprinkler, the combination of a nozzle, a spindle axially in line therewith, an annular discharge-orifice between the nozzle-walls and the spindle, revoluble distributing-wings upon the spindle exterior to the nozzle, and a flexible band normally inclosing the nozzle and adapted to close a portion of said orifice to limit the flow of water therethrough.

In witness whereof I have hereunto set my hand.

PAUL MODERSON.

Witnesses:
S. H. NOURSE,
CHAS. E. TOWNSEND.